| United States Patent [19] | [11] | 4,080,360 |
|---|---|---|
| Schlichting et al. | [45] | Mar. 21, 1978 |

[54] THERMOPLASTIC POLYBUTYLENE TEREPHTHALATE MOLDING COMPOSITIONS

[75] Inventors: Karl Schlichting, Bobenheim-Roxheim; Peter Horn; Johannes Schlag, both of Ludwigshafen, all of Germany

[73] Assignee: BASF Aktiengesellschaft, Ludwigshafen, Germany

[21] Appl. No.: 677,907

[22] Filed: Apr. 19, 1976

[30] Foreign Application Priority Data

May 2, 1975 Germany .............................. 2519583

[51] Int. Cl.$^2$ .............................................. C08K 5/34
[52] U.S. Cl. ........................... 260/45.8 N; 260/40 R; 260/75 N; 260/239.3 R; 260/293.86; 260/326.5 FL

[58] Field of Search ............. 260/40 R, 45.8 N, 75 N, 260/239.3 R, 239.3 B

[56] References Cited

U.S. PATENT DOCUMENTS

| 3,769,259 | 10/1973 | Chalmers | ......................... 260/45.8 N |
| 3,956,310 | 5/1976 | Chalmers | ......................... 260/45.8 N |
| 3,962,255 | 6/1976 | Chalmers | ....................... 260/239.3 R |

*Primary Examiner*—Donald E. Czaja
*Assistant Examiner*—R. A. White
*Attorney, Agent, or Firm*—Keil, Thompson & Shurtleff

[57] ABSTRACT

Thermoplastic polybutylene terephthalate molding compositions of improved stability due to the presence of from 0.01 to 10 percent by weight, based on the total molding composition, of a lactam derivative.

1 Claim, No Drawings

THERMOPLASTIC POLYBUTYLENE TEREPHTHALATE MOLDING COMPOSITIONS

The invention relates to thermoplastic molding compositions, based on polybutylene terephthalate, which have improved properties, in particular improved heat stability and stability to oxygen.

Thermoplastic polyesters based on polybutylene terephthalate are becoming increasingly important as raw materials for the manufacture of moldings. As a molding composition, polybutylene terephthalate has substantial advantages over other thermoplastic polyesters, e.g. polyethylene terephthalate. In particular, it is substantially easier to injection-mold; even at low mold temperatures, e.g. from about 30 to 60° C, short cycles can be used when converting polybutylene terephthalate, to give highly crystalline and, accordingly, dimensionally stable moldings. Because of the high rate of crystallization, no mold release problems are encountered even at low temperatures. Furthermore, the dimensional stability of polybutylene terephthalate injection moldings is very good even at temperatures around, and substantially above, the glass transition temperature of polybutylene terephthalate.

Polybutylene terephthalate molded articles such as injection moldings or films are resistant to sustained exposure to temperatures of up to 105° – 115° C. At higher temperatures, the atmospheric oxygen brings about a change in chemical and physical structure, resulting in more or less rapid deterioration of performance characteristics. In addition to discoloration, a parallel deterioration in mechanical properties, especially toughness, is found. Molding compositions which have undergone this thermooxidative damage cannot be used in practice, because their properties are no longer adequate.

It is known to stabilize polymers, which are exposed to air at elevated temperatures for extended periods, by incorporation of suitable additives. This slows down thermooxidative degradation and prevents rapid damage to the polymeric material, so that the deterioration in toughness and other mechanical properties is retarded.

It is an object of the present invention to increase the resistance to heat aging of thermoplastic polybutylene terephthalate molding compositions.

We have found that this object is achieved by polybutylene terephthalate injection molding compositions, having a relative viscosity of from 1.3 to 2.0 measured in a 3:2 (by weight) phenol/ o-dichlorobenzene mixture at 25° C, which contain from 0.01 to 10% by weight, preferably from 0.1 to 5% by weight, of compounds which contain one or more structural units

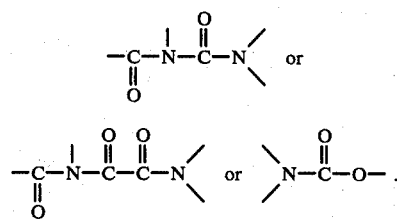

Compounds of the general formula

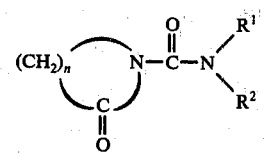

where $n$ is from 3 to 11, $R^1$ is hydrogen, alkyl, cycloalkyl, aralkyl, alkaryl or a heterocyclic radical, and $R^2$ is alkyl, cycloalkyl, aryl or

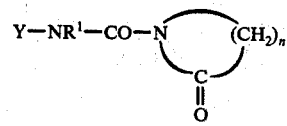

where Y is alkyl, cycloalkyl or aryl and $n$ and $R^1$ have the above meanings, are particularly suitable.

Suitable compounds which contain at least 1 structural unit

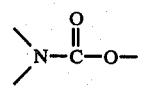

are, in particular, compounds of the general formula II

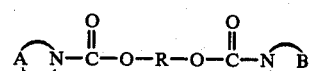

where R is alkylene of 2 to 20 carbon atoms, substituted alkylene, cycloalkylene or arylene and

are identical or different and each is

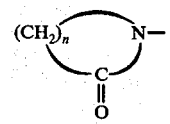

where $n$ is from 3 to 11, or a heterocyclic radical.

Preferred compounds of Class I are N,N-disubstituted carbamoyl-lactams. These are prepared by phosgenation of the corresponding secondary amines and subsequent reaction of the resulting carbamyl chlorides with lactams. If the free bases are used, half the amine is converted to the carbamyl chloride and the other half precipitates as the hydrochloride:

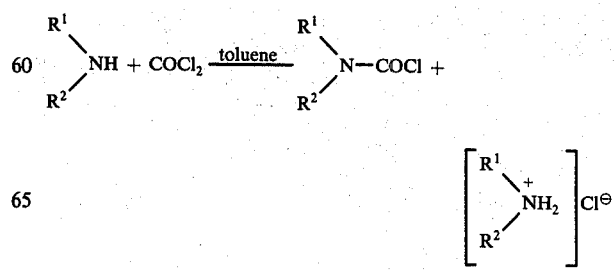

The diarylcarbamyl chlorides are particularly easy to manufacture. Because of the thermal instability of their hydrochlorides, the total amount of the amines can be converted quantitatively to the carbamyl chlorides at a moderately elevated temperature. For the same reason, diarylcarbamoyllactams can be manufactured particularly simply in a one-pot process. After the phosgenation, hydrogen chloride and excess phosgene are driven off with inert gas and the dissolved carbamyl chloride is reacted directly with the corresponding lactam.

Preferred compounds of Class II are lactam-N-carboxylic acid esters. They are prepared by phosgenation of the corresponding lactim-ethers. Lactim-ethers, in an inert solvent, are reacted with phosgene in the presence of reagents which bind hydrogen chloride, and the corresponding 1-aza-2-hydroxycycloalk-2-ene-1-carboxylic acid chlorides, etherified in the 2-position, of the formula (III), are obtained in good yields.

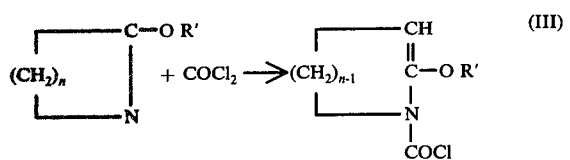

When an excess of hydrogen halide is then passed into a solution of (III) at from 20° to 100° C, lactam-N-carboxylic acid chlorides are obtained in almost quantitative yield:

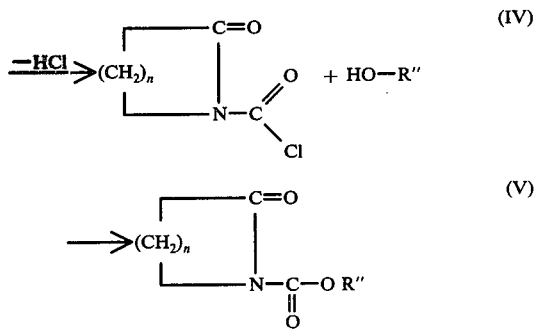

The desired lactam-N-carboxylic acid esters can be obtained from IV by reaction with monohydric or polyhydric alcohols under the same conditions.

The polyester molding compositions of the invention, which are stabilized with the compounds of Class I or II, contain polybutylene terephthalate, which can be modified with up to 20 mole% of other dicarboxylic acids or alcohols. Examples of suitable modifiers are aliphatic dicarboxylic acids of up to 20 carbon atoms, and cycloaliphatic or aromatic dicarboxylic acids with 1 or 2 aromatic rings. Examples thereof are adipic acid, sebacic acid, cyclohexanedicarboxylic acid, isophthalic acid and naphthalenedicarboxylic acid. Suitable alcoholic modifiers are in particular aliphatic and cycloaliphatic glycols of 2 to 10 carbon atoms, e.g. ethylene glycol, propylene glycol, 1,6-hexanediol, neopentyl glycol, diethylene glycol and 1,4-bis-hydroxymethylcyclohexane, as well as bisphenols, substituted bisphenols or their reaction products with alkylene oxides.

To improve the properties of the material it may be appropriate to co-condense small amounts of trifunctional and polyfunctional crosslinking agents, e.g. trimethylolpropane or trimesic acid, when preparing the polybutylene terephthalate. The polybutylene terephthalate molding compositions stabilized in accordance with the invention can furthermore be modified, if appropriate, with up to 30 parts by weight of other thermoplastics, e.g. aromatic polycarbonates and/or polytetrafluoroethylenes.

The polybutylene terephthalate empolyed for the manufacture of the polybutylene terephthalate molding compositions according to the invention has a relative viscosity of from 1.3 to 2.0, preferably from 1.5 to 1.7. The relative viscosity was determined on a 0.5% strength solution at 25° C in a 3:2 phenol/o-dichlorobenzene mixture, using an Ubbelohde viscometer.

In addition to the stabilizers according to the invention, the polybutylene terephthalate molding compositions can contain other, synergistic, stabilizers based on cryptophenols and carbodiimides in amounts of from 0.01 to 5% by weight, based on the polymer.

The amount used of the stabilizer compound from Classes I and II is usually from 0.01 to 5 percent by weight, preferably from 0.1 to 1 percent by weight, based on polybutylene terephthalate.

The stabilizers based on Classes I and II can be added to the polyester during or after its polycondensation. The preferred method is thorough mixing of the pulverulent or granular polybutylene terephthalate with the stabilizer at room temperature, melting and thorough homogenizing in an extruder or kneader, with subsequent extrusion into a waterbath, and granulation. The molding compositions according to the invention are then converted into, e.g., injection moldings or films, in a further step, by processes conventionally used for thermoplastics.

In addition to the stabilizers, the polybutylene terephthalate molding compositions of the invention may contain reinforcing agents, e.g. glass fibers, glass beads and/or mineral fillers, such as asbestos, chalk, kaolin, quartz, talc, etc., as well as further adjuvants such as pigments, organic dyes, waxes, lubricants, processing assistants, UV stabilizers and antistatic agents.

The Examples which follow illustrate the stabilization of polybutylene terephthalate described above, in respect of the process used and of the effect of the stabilizers employed. Percentages are by weight. As a characteristic mechanical property used for testing the aging properties (heat stability), the impact strength on DIN 53,453 standard test bars was measured. The standard bars, of size 4 × 6 × 50 mm, were kept in air at 140° C. After 1, 3, 7, 14, 30, 60 and 90 days, 10 bars per material were taken in each case and their impact strength was tested according to DIN 53,453.

EXAMPLE 2 kg portions of polybutylene terephthalate of relative viscosity 1.663 are mixed mechanically with the stabilizer compounds listed in Table 1, and melted and extruded in a twinscrew kneader (Werner und Pfleiderer type ZDSK 28), heated to 250° C, at 150 revolutions per minute, with a throughput of 2 kg per hour. The extruded mixture was granulated, dried and injection-molded to give DIN 53,453 standard bars (material temperature 240° C, mold temperature 60° C). The color of the standard bars was assessed visually before and after storage at 140° C. Furthermore, the relative viscosity was determined on the untreated standard bars. The results are shown in Table 1.

| % w/w | Stabilizer | Relative viscosity of the molding | Intrinsic color of the molding | Discoloration in comparison to unstabilized polybutylene terephthalate | Impact strength, DIN 53,453 (number of days after which fracture occurs) |
|---|---|---|---|---|---|
| | — | 1.45 | light | — | 1 |
| 1.0 | (CH$_2$)$_5$ ring with N—C(=O)—N(H)(cyclohexyl)(cyclohexyl)... N—C=O | 1.56 | light | somewhat worse | 30 |
| 0.57 | (CH$_2$)$_5$ ring with N—C(=O)—N(CH$_3$)(p-methoxyphenyl)... N—C=O | 1.495 | light | somewhat worse | 20 |
| 1.0 | (CH$_2$)$_7$ ring with N—C(=O)—N(phenyl)(phenyl)... N—C=O | 1.585 | light | somewhat worse | 60 |
| 0.11 | (CH$_2$)$_5$ ring with N—C(=O)—N(fluorenyl-9)... N—C=O | 1.57 | light | same as without stabilizer | 60 |
| 1.0 | (CH$_2$)$_5$ ring with N—C(=O)—N(phenyl)(phenyl)... N—C=O | 1.59 | light | same as without stabilizer | does not fracture after 90 days |
| 0.39 | O=C(—O—CH$_2$—)—(cyclohexylene)—(—CH$_2$—O—C=O) with 2-pyridinone-N groups on both ends | 1.565 | light | same as without stabilizer | 30 |

| % w/w | Stabilizer | Relative viscosity of the molding | Intrinsic color of the molding | Discoloration in comparison to unstabilized polybutylene terephthalate | Impact strength, DIN 53,453 (number of days after which fracture occurs) |
|---|---|---|---|---|---|
| 1.0 | 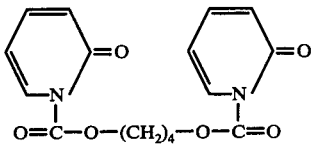 | 1.58 | light | somewhat worse | 30 |
| 1.0 | 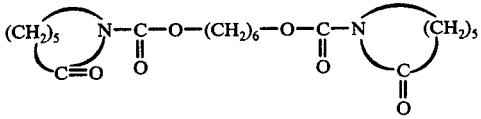 | 1.58 | light | somewhat worse | does not fracture after 90 days |
| 0.43 | 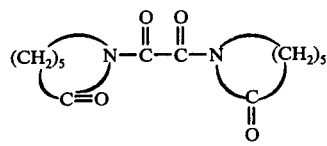 | 1.54 | light | same as without stabilizer | 30 |
| 0.46 | 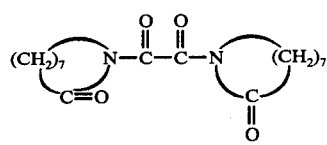 | 1.505 | light | same as without stabilizer | 30 |

We claim:
1. A stabilized polybutylene terephthalate molding composition in which the polybutylene terephthalate has a relative viscosity of from about 1.3 to 2.3, measured on an 0.5 percent strength solution in a 3:2 by weight phenol/o-dichlorobenzene mixture at 25° C, which composition contains from about 0.01 to 10 percent by weight based on the total molding composition, of a compound selected from the group consisting of

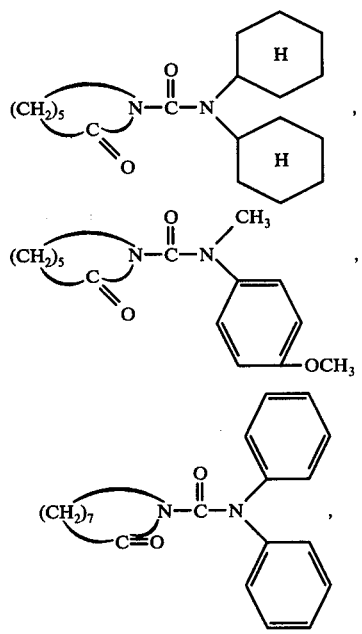

-continued

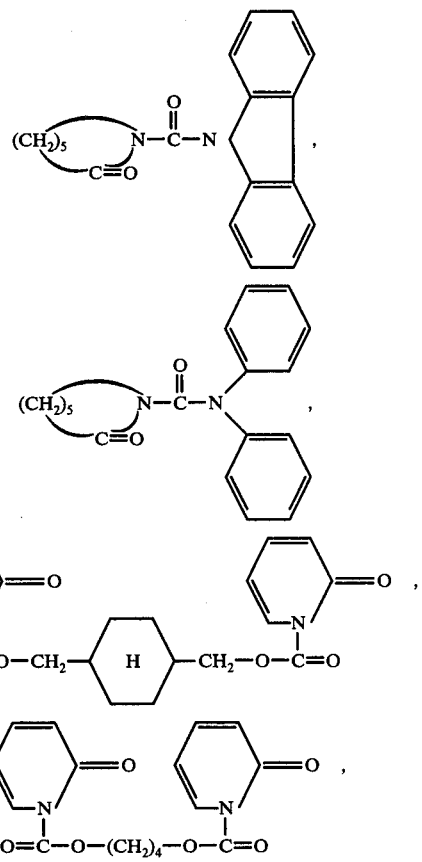

-continued
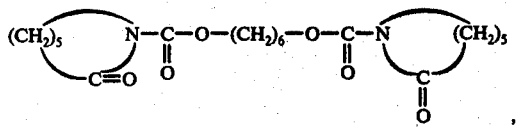
-continued
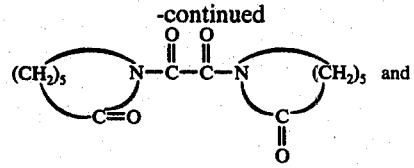 and
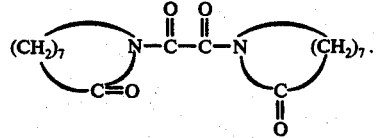
* * * * *